US008693840B2

(12) United States Patent
Jia

(10) Patent No.: US 8,693,840 B2
(45) Date of Patent: Apr. 8, 2014

(54) METHOD AND TERMINAL FOR VIDEO PROCESSING

(75) Inventor: Rong Jia, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/521,063

(22) PCT Filed: Dec. 9, 2010

(86) PCT No.: PCT/CN2010/079626
§ 371 (c)(1),
(2), (4) Date: Jul. 9, 2012

(87) PCT Pub. No.: WO2011/124075
PCT Pub. Date: Oct. 13, 2011

(65) Prior Publication Data
US 2013/0011123 A1    Jan. 10, 2013

(30) Foreign Application Priority Data

Apr. 7, 2010 (CN) .......................... 2010 1 0146082

(51) Int. Cl.
*H04N 5/932* (2006.01)
(52) U.S. Cl.
USPC .......................................... 386/210; 386/219
(58) Field of Classification Search
None
See application file for complete search history.

(56) References Cited

U.S. PATENT DOCUMENTS

| 2001/0033736 | A1 | 10/2001 | Yap et al. |
| 2002/0009285 | A1 | 1/2002 | Safadi et al. |
| 2008/0155062 | A1* | 6/2008 | Rabold et al. ................. 709/219 |
| 2008/0246851 | A1 | 10/2008 | Jung et al. |
| 2009/0060472 | A1 | 3/2009 | Bull |
| 2009/0097548 | A1* | 4/2009 | Karczewicz et al. .... 375/240.03 |
| 2009/0171674 | A1* | 7/2009 | Mitsumori ................... 704/500 |

FOREIGN PATENT DOCUMENTS

CN    1312521 A    9/2001

(Continued)

OTHER PUBLICATIONS

International Search Report in international application No. PCT/CN2010/079626, mailed on Mar. 17, 2011.

(Continued)

*Primary Examiner* — William C Vaughn, Jr.
*Assistant Examiner* — Eileen Adams
(74) *Attorney, Agent, or Firm* — Oppedahl Patent Law Firm LLC

(57) ABSTRACT

The disclosure discloses a method and a terminal for video processing. The method includes: when a real-time video image receiving terminal plays a real-time image picture, a shortcut for image pre-capture is set; if a user is interested in the picture, the user can click the shortcut for image pre-capture; when receiving an image pre-capture instruction, the terminal suspends the playing of the real-time picture but plays the pictures of a period before the moment of playing the real-time picture, then the user can perform image capture on the pictures played back. With the disclosure, when a user captures an image, the video pictures being played in the terminal are pre-stored, and the video pictures of a period before current time point are presented to the user by slow playback, thus the user can capture the image in easiness, so as not to miss the image that the user wants to capture due to a slow response.

6 Claims, 2 Drawing Sheets

(56) References Cited

FOREIGN PATENT DOCUMENTS

| | | |
|---|---|---|
| CN | 1409245 A | 4/2003 |
| CN | 1598893 A | 3/2005 |
| CN | 1819660 A | 8/2006 |
| CN | 101815199 A | 8/2010 |
| EP | 0594241 A1 | 4/1994 |
| EP | 1978741 A1 | 10/2008 |

OTHER PUBLICATIONS

English Translation of the Written Opinion of the International Search Authority in international application No. PCT/CN2010/079626, mailed on Mar. 17, 2011.

Supplementary European Search Report in European application No. 10849311.5, mailed on May 2, 2013.

* cited by examiner

METHOD AND TERMINAL FOR VIDEO PROCESSING

TECHNICAL FIELD

The disclosure relates to the technical field of wireless communications, and in particular to a method and a terminal for video processing.

BACKGROUND

In recent years, with rapid development of communication technologies, a user can receive and watch various real-time video programs by a computer, a cell phone or other terminals. When real-time image data is being played, if a user is interested in a picture and needs to capture an image, it is most probably that, when the user is to capture the image, the image desired by the user has flashed past, resulting in image capture failure, due to sensory delay of human being. Therefore, it is necessary to provide a new video processing method to solve the problem mentioned above.

SUMMARY

In view of this, the main object of the disclosure is to provide a method and a terminal for video processing, for solving the problem that a user cannot accurately obtain a picture that the user wants to capture during a playing process of real-time video pictures.

In order to realize the object above, the disclosure provides a method for video processing: when a real-time video image receiving terminal plays a real-time video picture and receives an image pre-capture instruction, starting image pre-capture processing and controlling the terminal to suspends playing of the real-time picture but to play pictures of a period before the moment of playing the real-time picture for a user to process the pictures played back.

The processing may refer to performing image capture on video pictures.

While the real-time video image receiving terminal plays a real-time video picture, real-time video data may be stored into an cache area of a memory of the terminal.

The memory may configured as two cache areas, namely, an odd-number cache area and an even-number cache area; the data may be stored into the odd-number cache area and the even-number cache area respectively according to frame headers.

A first frame data of the video data may be stored into the lowest bit address of the odd-number cache area; a second frame data may be stored into the lowest bit address of the even-number cache area; when a third frame data is received, the first frame data may be stored into a higher bit address adjacent to original address of the first frame data and the third frame data may be stored into the lowest bit address of the odd-number cache area, and so on; the even-number cache area may apply the same operation, that is, when a fourth frame data is received, the second frame data may be stored into a higher bit address adjacent to original address of the second frame data and the fourth frame data may be stored into the lowest bit address of the even-number cache area, and so on; all the real-time data may be stored into the lowest bit address of the odd-number cache area or the even-number cache area; data of other frames may be stored in turn into incremental addresses according to frame headers.

When the user starts the image pre-capture processing, a digital processor of the terminal may stop transmitting real-time image data to a display but read out data from the cache areas; data in the two cache areas may be updated alternatively; in a first clock period, real-time data may be stored into the odd-number cache area, while data may be read out from the highest bit address of the odd-number cache area; in a next clock period, real-time data may be stored into the even-number cache area while the odd-number cache area may be not updated, and data may be still read out from the highest bit address of the odd-number cache area; in a third clock period, real-time data may be stored into the odd-number cache area while the even-number cache area may be not updated, and data may be read out from the highest bit address of the even-number cache area; in a fourth clock period, real-time data may be stored into the even-number cache area, while data may be read out from the highest bit address of the even-number cache area; and so on; data of one frame may be transmitted to a multimedia processor for two continuous clock periods.

After the user performs the image capture on the pictures, the terminal may store image data into a specified area of the memory; after the captured image data is stored, the digital processor may stop reading image data from the cache areas but transmit received real-time image data to the display to display; then normal playing may be recovered.

The disclosure further provides a terminal, including a digital processor, a display and a memory, wherein the digital processor has an image capture control unit; on one hand, the digital processor receives real-time video data, accomplishes codec processing and then transmits data to the display to display; on the other hand, the digital processor stores real-time data into the memory of the terminal; the memory is configured with cache areas; the image capture control unit, after receiving a video image pre-capture instruction, stops transmitting real-time image data to the display but reads out, from the cache areas, video data of a period before this moment for a user to perform image capture.

The cache areas may be configured as an odd-number cache area and an even-number cache area, and data in the two cache areas may be updated alternatively; in a first clock period, real-time data may be stored into the odd-number cache area, while data may be read out from the highest bit address of the odd-number cache area; in a next clock period, real-time data may be stored into the even-number cache area while the odd-number cache area may be not updated, and data may be still read from the highest bit address of the odd-number cache area; in a third clock period, real-time data may be stored into the odd-number cache area while the even-number cache area may be not updated, and data may be read out from the highest bit address of the even-number cache area; in a fourth clock period, real-time data may be stored into the even-number cache area, while data may be read out from the highest bit address of the even-number cache area; and so on; data of one frame may be transmitted to a multimedia processor for two continuous clock periods.

After the user performs the image capture on pictures, the image capture control unit of the digital processor may store image data into a specified area of the memory and finishes the image capture processing; after the captured image data is stored, the image capture control unit of the digital processor may respond to an interruption command, stop reading image data from the cache areas but transmit received real-time image data to the display to display, then normal playing may be recovered.

To sum up, compared with the prior art, when a user captures an image, the technical scheme of the disclosure pre-stores the video pictures being played on the terminal and presents video pictures of a period before current time point to the user by slow playback, thus the user can capture the image in easiness, so as not to miss the image that the user wants to capture due to a slow response.

DETAILED DESCRIPTION

The disclosure provides a method and a terminal for video processing, for solving the problem that a user cannot accurately obtain a picture that the user wants to capture during a playing process of real-time video pictures.

In order to solve the problem above, the disclosure provides a method and a terminal for image capture of real-time video pictures; the main idea is that: a shortcut for image pre-capture is set when a real-time video image receiving terminal plays a real-time picture; if a user is interested in the picture, the user can click the shortcut for image pre-capture, while the terminal suspends playing of the real-time picture and plays pictures of a period before the moment of playing the real-time picture; then the user can perform image capture on the pictures played back.

The disclosure is further illustrated below in detail in conjunction with accompanying drawings and specific embodiments.

Figure 2:
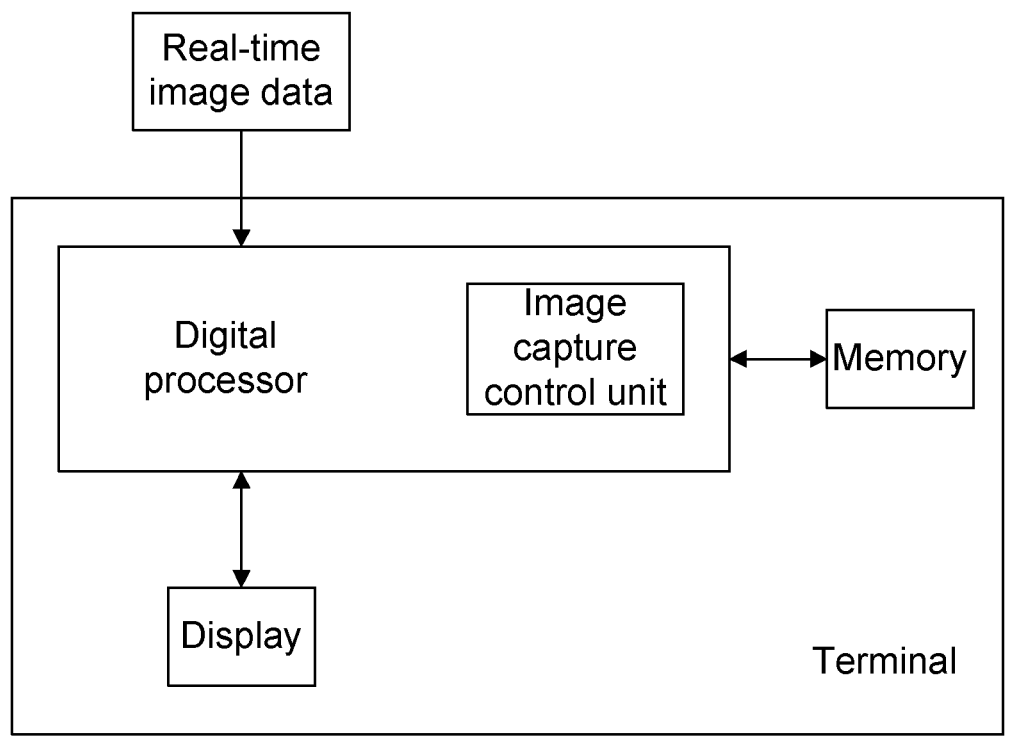
FIG. 2 shows a structure diagram of a terminal according to an embodiment of the disclosure.

FIG. 2 shows a diagram of a terminal according to an embodiment of the disclosure, including a digital processor, a display and a memory, wherein the digital processor has an image capture control unit.

The terminal receives a real-time video image signal; on one hand, the digital processor inside the terminal receives real-time video data, accomplishes codec processing and then transmits the processed data to the display to display; on the other hand, the digital processor stores real-time data into the memory of the terminal; the memory is configured with two cache areas, namely, an odd-number cache area and an even-number cache area; the data is stored into the odd-number cache area and the even-number cache area respectively according to frame headers. A first frame data is stored into the lowest bit address of the odd-number cache area; a second frame data is stored into the lowest bit address of the even-number cache area; when a third frame data is received, the first frame data is stored into a higher bit address adjacent to the original address of the first frame data and the third frame data is stored into the lowest bit address of the odd-number cache area, and so on. Even-number cache area applies the same operation, that is, when a fourth frame data is received, the second frame data is stored into a higher bit address adjacent to original address of the second frame data and the fourth frame data is stored into the lowest bit address of the even-number cache area, and so on. All the real-time data are stored into the lowest bit address of the odd-number cache area or the even-number cache area; the data of other frames are stored in turn into incremental addresses according to frame headers.

After the shortcut for image pre-capture is clicked, the digital processor suspends the transmission of real-time image data to the display, but reads the stored image data from the highest bit addresses of the odd-number cache area and the even-number cache area alternatively and transmits the data read out to the display to display.

The user performs image capture according to playback pictures displayed by the terminal to obtain a captured image.

After the user captures the image, the captured image is stored into the memory of the terminal; the digital processor continues transmitting real-time image data to the display; then normal playing is recovered.

Figure 1:
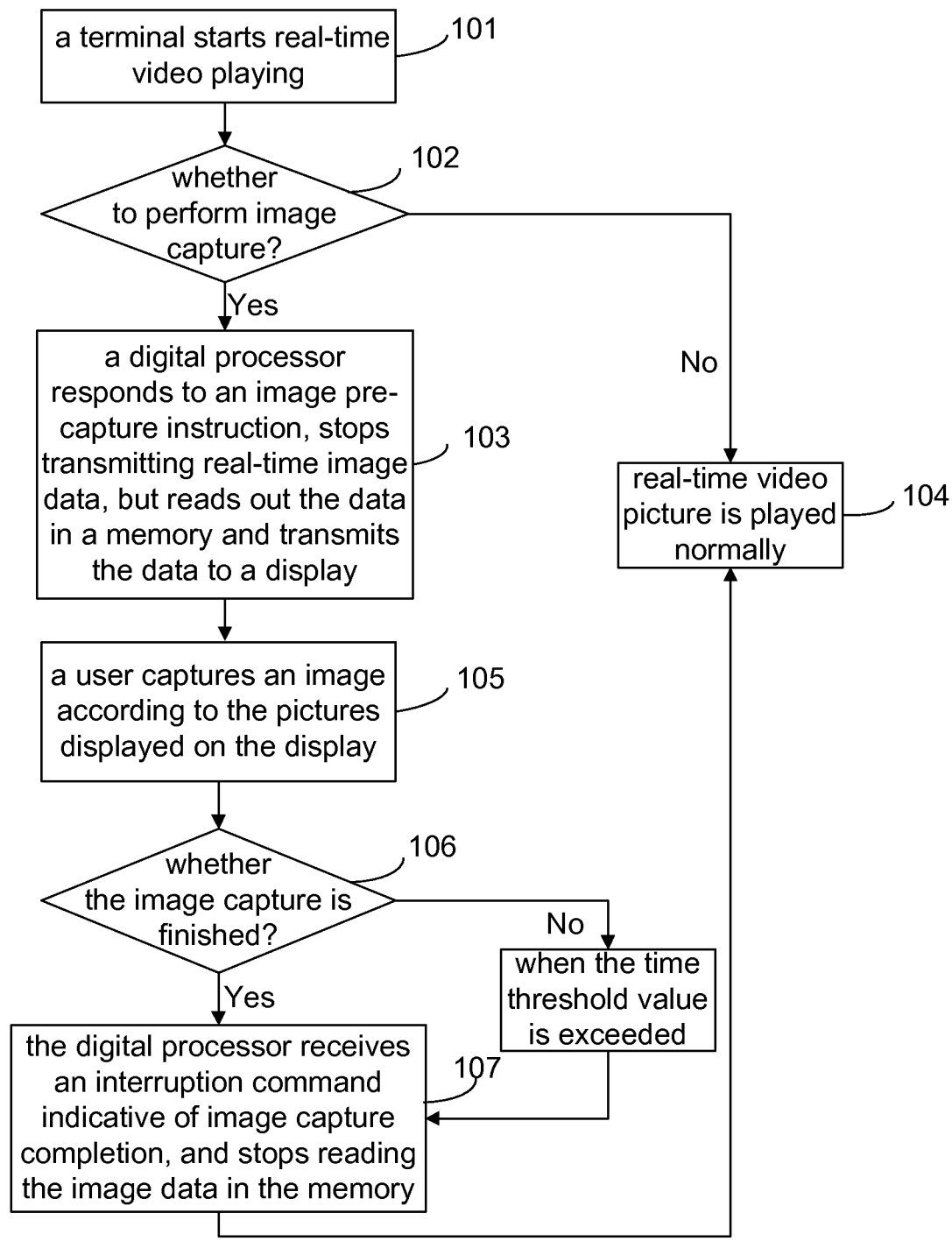
FIG. 1 shows a flowchart of a method for video processing according to an embodiment of the disclosure.

FIG. 1 shows specific implementation of a method for video processing according to the disclosure; the implementation of the method mainly lies in design of a software method, which can be implemented on an existing terminal system without increasing hardware cost. Video images that a user needs can be accurately captured by applying the method.

The terminal receives and plays a real-time picture; when a user needs to perform image capture on the picture, the user can click the shortcut for image pre-capture to send an image pre-capture instruction, then the terminal suspends the playing of the real-time picture and plays back pictures which were displayed a period before. The terminal is pre-configured with an odd-number cache area and an even-number cache area which can reduce a reading rate (that is, frame frequency) of image data by a half, to realize slow playing of pictures, so that the user can successfully capture desired images.

As shown in FIG. 1, the specific process of the method above is as follows.

Step 101: the terminal starts real-time video playing.

Real-time video playing software is started on the terminal.

Step 102: the terminal determines whether to perform image capture.

The terminal determines whether an image pre-capture instruction is received from a user, if the user selects image pre-capture, step 103 is executed, otherwise, step 104 is executed.

Step 103: the digital processor responds to the image pre-capture instruction, stops transmitting real-time image data, reads out data in the memory and transmits the data to the display.

The terminal receives real-time image data, and divides data flows into two flow directions under the control of the digital processor, wherein one group of data is transmitted to the display to be displayed and played normally; the other group of data is transmitted to the memory of the terminal, wherein partial area of the memory is used as a cache area and is divided into an odd-number cache area and an even-number cache area with the same capacity. This operation is started once the terminal starts the playing software. A first frame data received is stored into the lowest bit address of the odd-number cache area; a second frame data is stored into the lowest bit address of the even-number cache area; when a third frame data is received, the first frame data is stored into an adjacent higher bit address and the third frame data is stored into the lowest bit address of the cache area, and so on. The even-number cache area applies the same operation, until the two cache areas are full; real-time frame data are always stored into the lowest bit addresses.

If the user does not select an image capture operation, then on one hand, the terminal plays normally, on the other hand, the terminal updates cached data in cache areas; when the user selects an image capture operation, the image capture control unit of the digital processor stops transmitting real-time image data to the display after receiving the instruction, and reads data from cache areas, wherein an odd-number cache area and an even-number cache area are set and data in the two cache areas are updated alternatively. In a first clock period, real-time data is stored into the odd-number cache area while data is read out from the highest bit address of the odd-number cache area; in a next clock period, real-time data is stored into the even-number cache area, while the odd-number cache area is not updated, and data is still read out from the highest bit address of the odd-number cache area; in a third clock period, real-time data is stored into the odd-number cache area while the even-number cache area is not updated, and data is read out from the highest bit address of the even-number cache area; in a fourth clock period, real-time data is stored into the even-number cache area, while data is read out from the highest bit address of the even-number cache area; and so on. In this way, data of one frame can be transmitted to a multimedia processor for two continuous clock periods, which is equivalent to reduction of frame frequency, so as to achieve slow playing of pictures.

Step 104: a real-time video picture is played normally.

Step 105: the user captures an image according to pictures displayed on the display.

The display displays pictures played back, and the user performs an image capture operation; at this moment, what is displayed by the display is the image data in the cache areas, the image frame frequency is reduced by a half, so that the user can perform image capture on the pictures played back slowly.

Step 106: it is determined whether the user finishes the image capture operation, if the image capture operation is finished and the image is saved, step 107 is executed immediately; if the operation is not performed, step 107 is executed after a time threshold value, wherein the time threshold value can be set by the user; in the embodiment, the time threshold value can be set to be 5 seconds or 10 seconds.

After the user performs image capture on the pictures, the image data can be stored into a specified area of the memory; then the image capture operation is finished; after the image is captured, if no operation is performed to the image when the time threshold value is exceeded, it is also considered that the image capture operation is finished.

Step 107: the digital processor receives an interruption signal indicative of image capture completion, and stops reading the data in the cache areas of the memory; then step 104 is executed.

After the captured image data is saved, the image capture control unit of the digital processor responds to the interruption command, stops reading image data from the cache areas and transmits the received real-time image data to the display to display; then normal playing is recovered.

Of course, the disclosure also can have many implementation modes; without departing from the spirit and essence of the disclosure, those skilled in the art can make various corresponding modifications and changes according to the disclosure, however, any modification, equivalent substitute and improvement within the spirit and principle of the disclosure are deemed to be included within the protection scope of the disclosure.

The invention claimed is:

1. A method for video processing, comprising:
    starting image pre-capture processing when a real-time video image receiving terminal plays a real-time video picture and receives an image pre-capture instruction, and controlling the terminal to suspends playing of the real-time picture but to play pictures of a period before a moment of playing the real-time picture for a user to process the pictures played back;
    wherein while the real-time video image receiving terminal plays a real-time video picture, real-time video data is stored into an cache area of a memory of the terminal;
    wherein the memory is configured as two cache areas, namely, an odd-number cache area and an even-number cache area; the data are stored into the odd-number cache area and the even-number cache area respectively according to frame headers;
    wherein when the user starts the image pre-capture processing, a digital processor of the terminal stops transmitting real-time image data to a display but reads data out from the cache areas; data in the two cache areas are updated alternatively; in a first clock period, real-time data is stored into the odd-number cache area, while data is read out from the highest bit address of the odd-number cache area; in a next clock period, real-time data is stored into the even-number cache area while the odd-number cache area is not updated, and data is still read out from the highest bit address of the odd-number cache area; in a third clock period, real-time data is stored into the odd-number cache area while the even-number cache area is not updated, and data is read out from the highest bit address of the even-number cache area; in a fourth clock period, real-time data is stored into the even-number cache area, while data is read out from the highest bit address of the even-number cache area; and so on; data of one frame is transmitted to a multimedia processor for two continuous clock periods.

2. The method according to claim 1, wherein the processing refers to performing image capture on video pictures.

3. The method according to claim 1, wherein a first frame data of the video data is stored into a lowest bit address of the odd-number cache area; a second frame data is stored into a lowest bit address of the even-number cache area; when a third frame data is received, the first frame data is stored into a higher bit address adjacent to original address of the first frame data and the third frame data is stored into the lowest bit address of the odd-number cache area, and so on; the even-number cache area applies the same operation, that is, when a fourth frame data is received, the second frame data is stored into a higher bit address adjacent to original address of the second frame data and the fourth frame data is stored into the lowest bit address of the even-number cache area, and so on; all the real-time data are stored into the lowest bit address of the odd-number cache area or the even-number cache area; data of other frames are stored in turn into incremental addresses according to frame headers.

4. The method according to claim 1, wherein after the user performs the image capture on the pictures, the terminal stores image data into a specified area of the memory; after the captured image data is stored, the digital processor stops reading image data from the cache areas but transmits received real-time image data to the display to display, then normal playing is recovered.

5. A terminal, comprising a digital processor, a display and a memory, wherein the digital processor has an image capture control unit; on one hand, the digital processor receives real-time video data, accomplishes codec processing and then transmits the processed data to the display to display; on the other hand, the digital processor stores real-time data into the memory of the terminal; the memory is configured with cache areas; the image capture control unit, after receiving a video image pre-capture instruction, stops transmitting real-time image data to the display but reads out, from the cache areas, video data of a period before this moment for a user to perform image capture;
    wherein the cache areas are configured as an odd-number cache area and an even-number cache area, and data in the two cache areas are updated alternatively; in a first clock period, real-time data is stored into the odd-number cache area, while data is read out from a highest bit address of the odd-number cache area; in a next clock period, real-time data is stored into the even-number cache area while the odd-number cache area is not updated, and data is still read out from the highest bit address of the odd-number cache area; in a third clock period, real-time data is stored into the odd-number cache area while the even-number cache area is not updated, and data is read out from a highest bit address of the even-number cache area; in a fourth clock period, real-time data is stored into the even-number cache area, while data is read out from the highest bit address of the even-number cache area; and so on; data of one frame is transmitted to a multimedia processor for two continuous clock periods.

6. The terminal according to claim 5, wherein after the user performs the image capture on pictures, the image capture control unit of the digital processor stores image data into a specified area of the memory and finishes the image capture processing; after the captured image data is stored, the image capture control unit of the digital processor responds to an interruption command, stops reading image data from the cache areas but transmits received real-time image data to the display to display, then normal playing is recovered.

* * * * *